(12) United States Patent
Brown et al.

(10) Patent No.: US 10,709,235 B1
(45) Date of Patent: Jul. 14, 2020

(54) FOLDABLE TABLE

(71) Applicant: Teak Isle Manufacturing, Inc., Ocoee, FL (US)

(72) Inventors: Patrick Brown, Longwood, FL (US); Michael Smith, St. Cloud, FL (US)

(73) Assignee: Teak Isle Manufacturing, Inc., Ocoee, FL (US)

( * ) Notice: Subject to any disclaimer, the term of this patent is extended or adjusted under 35 U.S.C. 154(b) by 0 days.

(21) Appl. No.: 16/445,776

(22) Filed: Jun. 19, 2019

(51) Int. Cl.
*A47B 5/04* (2006.01)
*A47B 13/16* (2006.01)
*B60N 3/00* (2006.01)
*B63B 29/04* (2006.01)

(52) U.S. Cl.
CPC .............. *A47B 5/04* (2013.01); *A47B 13/16* (2013.01); *B60N 3/001* (2013.01); *B63B 2029/046* (2013.01)

(58) Field of Classification Search
CPC .. A47B 5/04; A47B 5/00; A47B 3/002; B60N 3/001; B63B 2029/046
See application file for complete search history.

(56) References Cited

U.S. PATENT DOCUMENTS

| | | | | |
|---|---|---|---|---|
| 2,483,899 A * | 10/1949 | Grasso | ...................... | A47B 5/04 108/134 |
| 2,843,436 A * | 7/1958 | Franks | ...................... | A47B 5/04 108/134 |
| 4,068,601 A * | 1/1978 | Marsh | ....................... | A47B 5/04 108/134 |
| 7,210,414 B1 * | 5/2007 | Barone | ..................... | A47B 5/00 108/152 |
| 8,267,017 B1 * | 9/2012 | Michael | ................... | A47B 5/04 108/134 |
| 8,607,777 B2 * | 12/2013 | Ducate, Jr. | ........... | A47J 37/0786 126/1 R |
| 9,357,839 B1 * | 6/2016 | Liu | ........... | A47B 5/02 |
| 9,414,670 B2 * | 8/2016 | Bo | ........... | A47B 5/04 |
| 10,508,484 B1 * | 12/2019 | Zhao | ......... | E05F 5/00 |
| 2006/0011106 A1 * | 1/2006 | Hauck | ...................... | A47B 5/04 108/36 |
| 2009/0308287 A1 * | 12/2009 | Chen | ........................ | A47B 5/04 108/42 |
| 2019/0320791 A1 * | 10/2019 | Yen | ........................ | A47B 77/10 |

FOREIGN PATENT DOCUMENTS

| | | | | |
|---|---|---|---|---|
| CA | 2892112 A1 * | 11/2016 | ................ | A47B 5/02 |
| EP | 3106063 A1 * | 12/2016 | ................ | A47B 5/04 |

* cited by examiner

*Primary Examiner* — Daniel J Rohrhoff
(74) *Attorney, Agent, or Firm* — Seyfarth Shaw LLP

(57) ABSTRACT

Foldable tables capable of being locked in place when positioned in a raised position and having a substantially narrow profile when in a folded position. The tables may be locked in place and folded via a support structure, and may have integrated beverage holders. The tables may also be mounted or coupled to furniture, exterior and/or interior walls, etc. such that the table is flush with the same when in the folded position. The support structure may also be mounted on an existing table.

12 Claims, 9 Drawing Sheets

FOLDABLE TABLE

TECHNICAL FIELD OF THE INVENTION

The present invention relates generally to tables. More particularly, the present invention relates to foldable tables.

BACKGROUND OF THE INVENTION

Tables are often used in recreation and marine vehicles. It is preferable to bring beverages and food onto or into the vehicles, and place them on a table. Tables often have cup holders. However, current tables are usually permanently installed and not easily movable to create more room for passengers and/or cargo.

SUMMARY OF THE INVENTION

The present invention broadly relates to foldable tables capable of being locked in place when positioned in a raised position and having a substantially narrow profile when in a folded position. The tables may be locked in place and folded using a support structure, and be mounted or coupled to furniture, exterior and/or interior walls, etc. such that the table is flush with the same when in the folded position. The tables may also have beverage holders.

In an embodiment, the present invention broadly includes a table including a table top pivotably coupled to a mounting structure, and a support structure pivotably coupled to the table top and the mounting structure. The support structure includes first and second arms that are pivotably and slidably coupled together, and adapted to pivot and slide to place the table top in raised or folded positions.

In another embodiment, the present invention broadly includes a table including a flange adapted to be coupled to a structure, and a table top pivotably coupled to the flange and adapted to be disposed in raised and folded positions. The table may also include a support structure pivotably coupled to the table top and the flange. The support structure includes first and second arms that each has first and second ends, wherein the first ends are pivotably coupled to the table top. The support structure also includes a third arm pivotably coupled to the flange and pivotably and slidably coupled to the second end of the first arm, and a fourth arm pivotably coupled to the flange and pivotably and slidably coupled to the second end of the second arm.

In another embodiment, the present invention broadly includes a method of moving a table from a folded position to a raised position. The method includes pivoting a table top disposed in the folded position in an upward direction. Pivoting, based on the pivoting of the table top, a first arm that is coupled to the table top with respect to a second arm. Causing, based on the pivoting of the first arm, a first finger portion of the first arm to abut an arm lock coupled to the second arm and flex away from a second finger portion of the first arm. Causing, based on the pivoting of the first arm, the arm lock to be received in a notch of the first finger portion. Causing, based on the pivoting of the first arm, the first finger portion to flexes towards the second arm when the arm lock is moved out of the notch and received between the first and second finger portions. Sliding the first arm downwardly with respect to the second arm to place the table top in the raised position.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
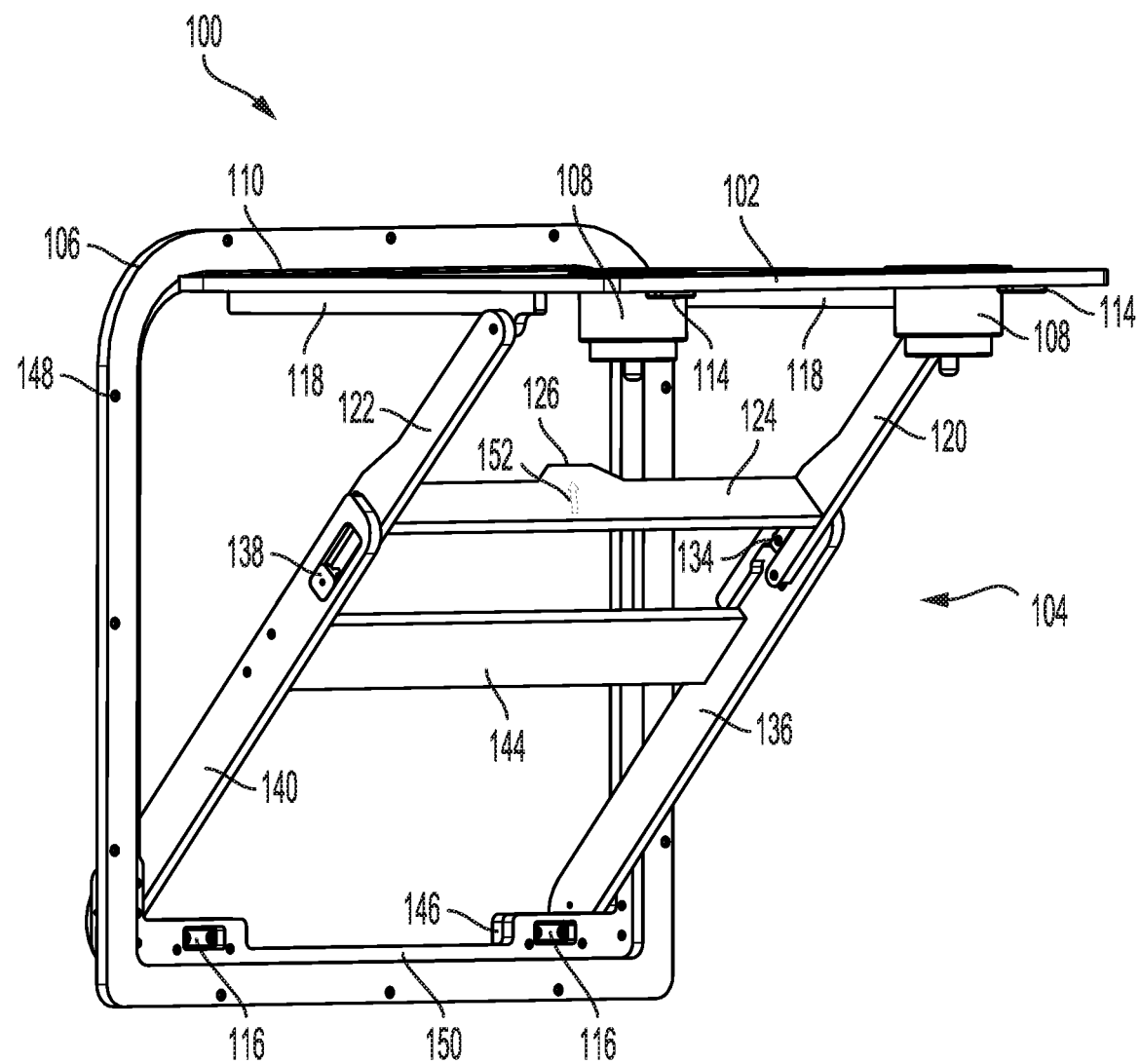
FIG. 1 is a perspective view of a foldable table in a raised position according to an embodiment of the present invention.
Figure 2:
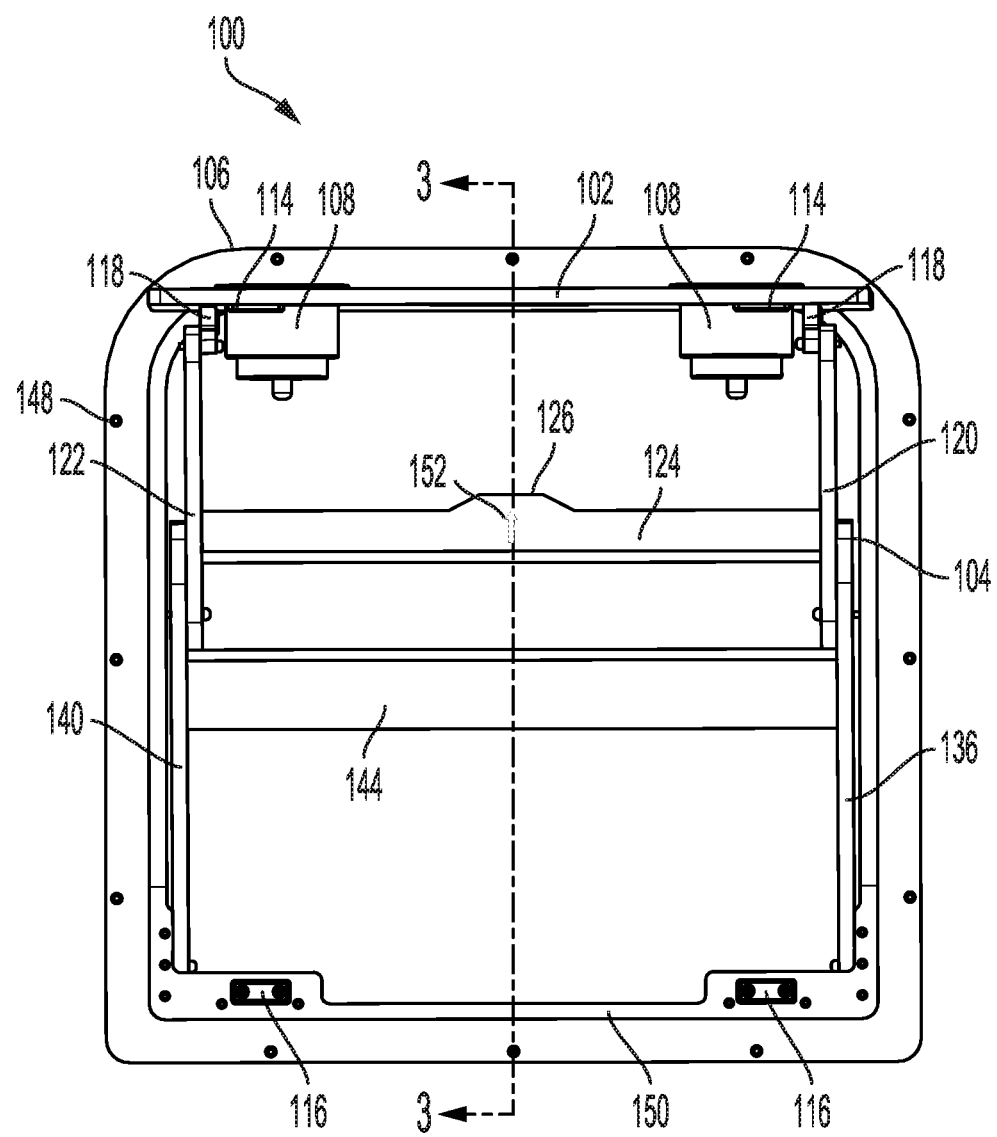
FIG. 2 is a front view of the foldable table of FIG. 1.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to foldable tables capable of being locked in place when positioned in a raised position and having a substantially narrow profile when in a folded position. The tables may be locked in place and folded via a support structure, and may have integrated beverage holders. The tables may also be mounted or coupled to furniture, exterior and/or interior walls, etc. such that the table is flush with the same when in the folded position.

Figure 3:
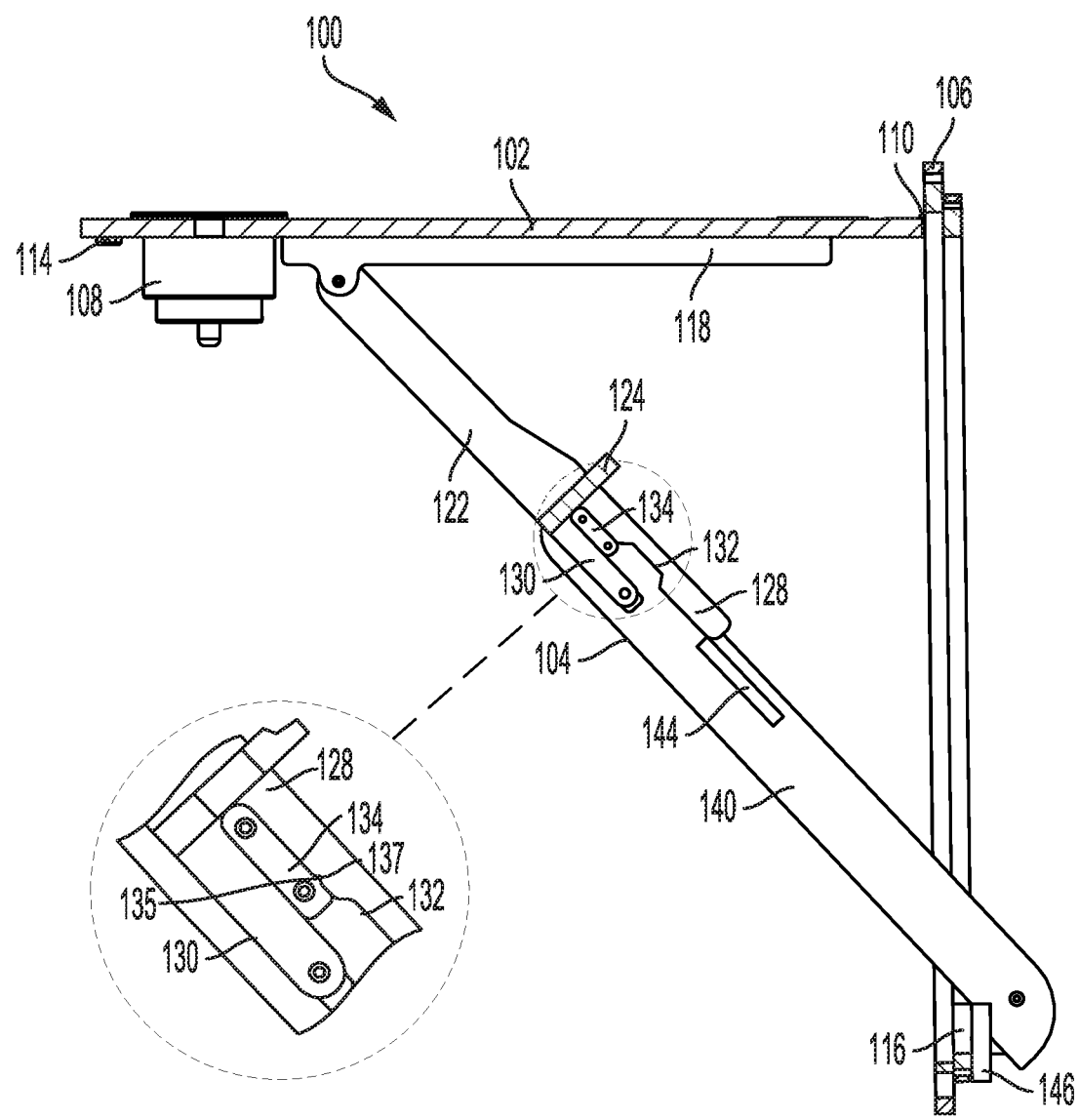
FIG. 3 is a side, section view of the foldable table of FIG. 2.
Figure 4:
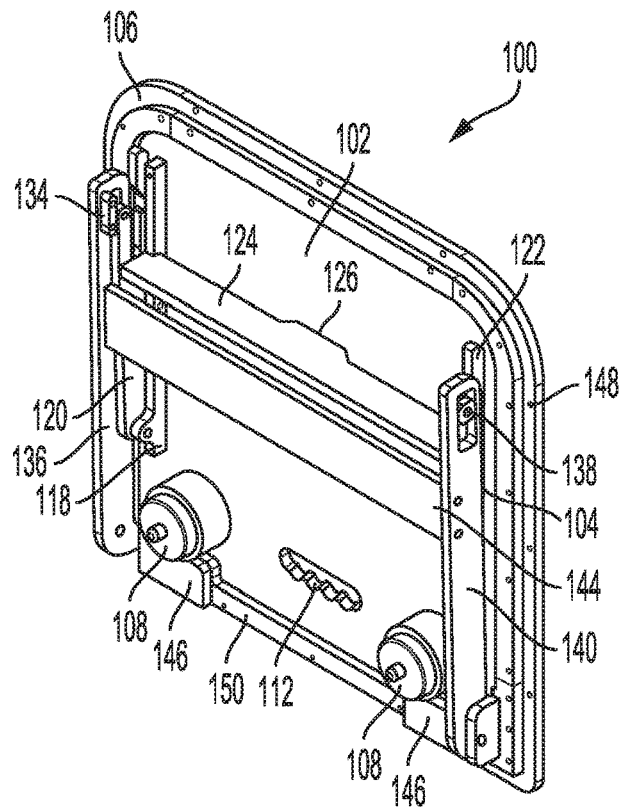
FIG. 4 is a perspective view of the foldable table of FIG. 1 in a folded position.

Referring to FIGS. 1 through 8, a foldable table 100 may be installed on or in a recreation or marine vehicle, or other structure where a foldable table is desired. The foldable table 100 may be movable between a first or raised position and a second or folded position. The foldable table 100 may be disposed or positioned in the raised position by one hand of a user, and may have a narrow profile when in the folded position, as shown in FIG. 4.

The foldable table 100 may include a table top 102, a support structure 104, and a mounting structure 106. The table top 102 is rotatably or pivotably coupled to the support structure 104 and the mounting structure 106. The support structure 104 is also rotatably or pivotably coupled to the mounting structure 106, which allows for the table 100 to be moved between the raised and folded positions.

The table top 102 may be substantially flat, and have protrusions (not shown) and/or a recess to assist in retaining objects on the table top 102 when the vehicle is in motion Although FIGS. 1 through 8 show the table top 102 as substantially square, the table top 102 may be various sizes and shapes without departing from the spirit and scope of the present invention. For example, the table top 102 may be a shape that is rectangular, circular, triangular, polygonal, or any other geometric shape.

The table top 102 may include a beverage holder 108, which may be various shapes and sizes to hold a variety of beverage containers. As illustrated, the table top 102 includes two circular beverage holders 108 that are recessed into apertures of the table top 102 and extend below a bottom of the table top 102. However, the beverage holder 108 may be integrally formed with the table top 102. Further, any number of beverage holders 108 in various shapes may be used and located anywhere on the table top 102 without departing from the spirit and scope of the present invention.

The table top 102 is rotatably or pivotably coupled to the mounting structure 106 by a hinge 110. The hinge 110 may be formed on or coupled to the table top 102 using one or more fasteners. Other methods to rotatably or pivotably couple the table top 102 to the mounting structure 106 may be used without departing from the spirit and scope of the present invention. For example, the table top 102 may be rotatably or pivotably coupled to the mounting structure 106 using one or more pins, elastically bendable connections, etc.

Figure 5:
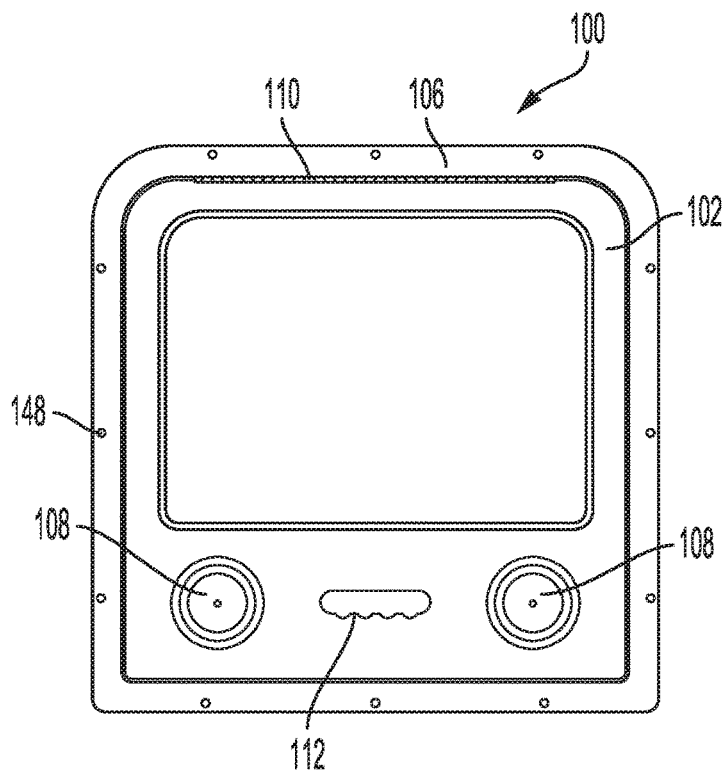
FIG. 5 is a front view of the foldable table of FIG. 1 in the folded position.
Figure 6:
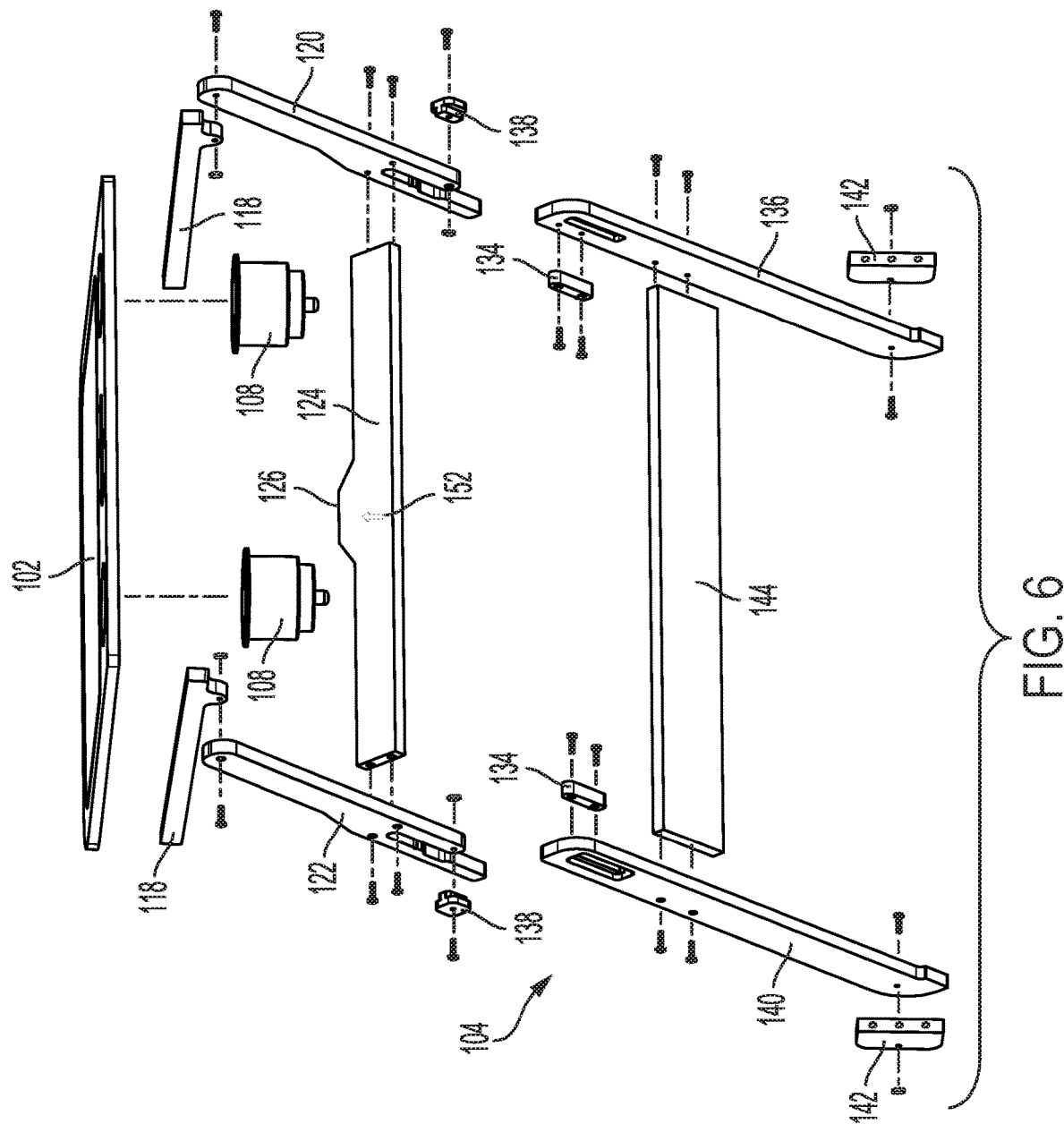
FIG. 6 is a perspective, exploded view of a support structure and a table top of the foldable table of FIG. 1.

Referring to FIGS. 4 and 5, a handle 112 may be formed on or coupled to the table top 102. For example, the handle 112 is formed by an aperture in the table top 102. The present invention is not limited to such a handle, and other known handles, which will be discussed in more detail below, may be used without departing from the spirit and scope of the present invention.

Referring to FIG. 1, a table protrusion 114 may be formed on or coupled to the table top 102, and a bottom side of the table top 102. The table protrusion 114 may be a ferrous element, such as a piece of metal, or a magnet, such as a plastic coated magnet. The table protrusion 114 may mate with a corresponding magnet 116 or corresponding ferrous element, which will be discussed in more detail below, to hold the foldable table 100 in the folded position and reduce unwanted noise caused by the table top 102 making contact with the mounting structure 106 when the vehicle is in motion. Although two table protrusions 114 are shown, any number of table protrusions 114 may be used without departing from the spirit and scope of the present invention. In addition, the present invention is not limited to such an arrangement, and other known arrangements may be used. For example, the table protrusion 114 may be a magnet adapted to mate with a ferrous element or corresponding magnet on the mounting structure 106.

A stiffener or support 118 may be formed on or coupled to a bottom surface of the table top 102. The support 118 provides additional stiffness and weight carrying capacity to the table top 102. As illustrated, two supports 118 (first and second supports 118) are used and are oriented longitudinally proximate sides of the table top 102. However, any number of supports 118 may be used without departing from the spirit and scope of the present invention. In addition, the present invention is not limited to such a support orientation, and other orientations may be used. For example, the support 118 may be oriented diagonally and/or along a front/back of the table top 102, etc.

Referring to FIGS. 1-6, the support structure 104 may include first and second arms 120, 122 each having a first end rotatably or pivotably coupled to a bottom surface of the table top 102 and/or respective first and second supports 118. The first and second arms 120, 122 may be constructed of King StarBoard high density polyethylene. However, other suitable materials, such as metals, wood, or polymers, may be used without departing from the spirit and scope of the present invention.

The first and second arms 120, 122 may be coupled together by a support member 124 that provides additional strength and stiffness to the support structure 104. For example, opposing first and second ends of the support member 124 may be coupled to the respective first and second arms 120, 122, and the support member 124 may be disposed away from the table top 102 when the table 100 is in the folded position. The support member 124 may also include a protrusion 126 disposed substantially on a central portion of the support member 124. The protrusion 126 may be disposed adjacent the table top 102 and assist in supporting the table top 102 when the table 100 is in the folded position, as shown in FIG. 4.

Referring to FIG. 3, a second end of each of the first and second arms 120, 122 may include first and second finger like portions 128, 130. The first finger like portion 128 may include a notch 132 adapted to increase the flexibility of the first finger like portion 128 and allow the first finger like portion 128 to rotate about an arm lock 134, which will be discussed in greater detail below.

Each of the first and second arms 120, 122 may be rotatably and slidably coupled to respective third and fourth arms 136, 140, via respective first and second slide blocks 138. For example, the first slide block 138 is rotatably coupled to a corresponding second finger like portion 130 of the first arm 120 and is slidably disposed in or coupled to a slot in the third arm 136. Accordingly, the first arm 120 may rotate and slide relative to the third arm 136. The slide block 138 may be a shape that prevents rotation in the slot of the third arm 136.

Similarly, the second slide block 138 is rotatably coupled to a corresponding second finger like portion 130 of the second arm 122 and is slidably disposed in or coupled to a slot in the fourth arm 140. Accordingly, the second arm 122 may rotate and slide relative to the fourth arm 140. The slide block 138 may be a shape that prevents rotation in the slot of the third arm 136. While the first and second slide blocks 138 are illustrated as a substantially square shape, any number and shapes of slide blocks 138 may be used without departing from the spirit and scope of the present invention.

Each of the third and fourth arms 136, 140 may be rotatably coupled at their respective second ends to respective arm mounts 142. The arm mounts 142 may be formed on or coupled to the mounting structure 106. The third and fourth arms 136, 140 may also be may be coupled together by a support member 144, for example using one or more fasteners. The support member 144 provides additional strength and stiffness to the support structure 104. However, the support member 144 may be omitted.

The arm locks 134, as described above, may be respectively formed on or coupled to the third and fourth arms 136, 140. The arm locks 134 (also referred to as first and second arm locks 134) may be adapted to fit in a respective space between the first and second finger like portions 128, 130 of the respective first and second arms 120, 122. For example, the first arm lock 134 is coupled to the first end of the third arm 136, and is received between the first and second finger like portions 128, 130 of the first arm 120. The first arm lock 134 is adapted to restrict the first arm 120 from rotating relative to the third arm 136 when the foldable table 100 is in the raised position. Similarly, the second arm lock 134 is coupled to the first end of the fourth arm 140, and is received between the first and second finger like portions 128, 130 of the second arm 122. The second arm lock 134 is adapted to restrict the second arm 122 from rotating relative to the fourth arm 140 when the foldable table 100 is in the raised position.

Each of, or one of, the first and second arm locks 134 may also include a protrusion 135 that engages with a corresponding detent 137 in the corresponding first finger like portion 128 of the respective first and second arms 120, 122. Although not necessary to hold the foldable table 100 in the raised position, the engagement of the protrusion 135 and the detent 137 further secures the foldable table 100 in the raised position.

Figure 7:
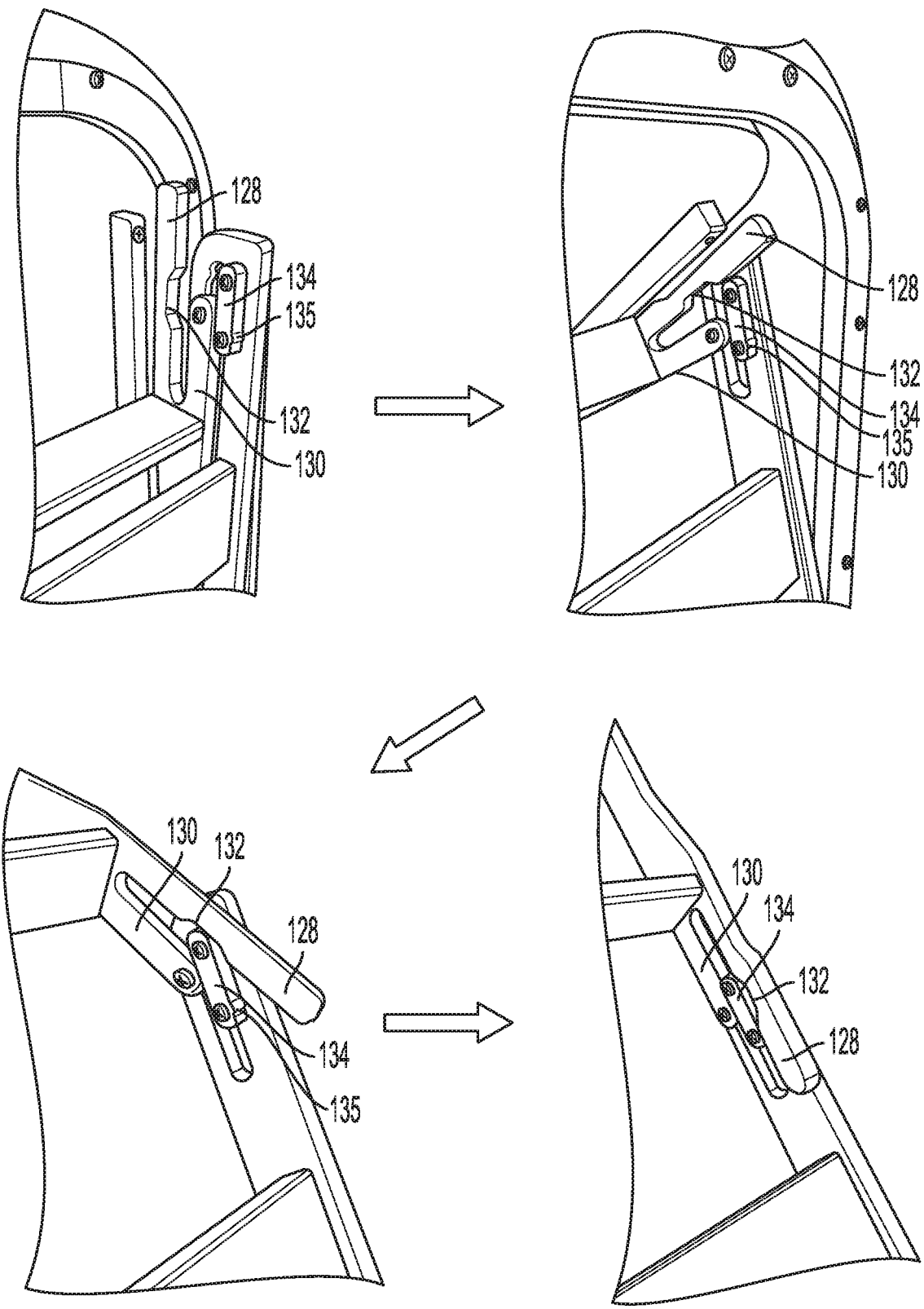
FIG. 7 is a flow diagram showing the steps of positioning the foldable table of FIG. 1 into a raised position according to an embodiment of the present invention.

Referring to FIG. 7, during a raising sequence when the table top 102 is moved from the folded position to the raised position, the first and second arms 120, 122 rotate or pivot with respect to the respective third and fourth arms 136, 140. For example, the second finger like portion 130 pivots against a side of the arm lock 134 until the first finger like portion 128 abuts an end of the arm lock 134. As the table top 102 is being raised further, the first finger like portion 128 flexes away from the second finger like portion 130, against a spring force of the first finger like portion 128, due to the interaction of the first and second finger like portions 128, 130 with the arm lock 134.

As the table top 102 is raised further, the arm lock 134 moves into the notch 132 in the first finger like portion 128, and the first finger like portion 128 flexes back towards the second finger like portion 130, due to the spring force of the first finger like portion 128. As the table top 102 is raised even further and the first and second arms 120, 122 are rotated or pivoted with respect to the respective third and fourth arms 136, 140, the arm lock 134 aligns with the space between the first and second finger like portions 128, 130. Once the arm lock 134 is aligned with the space between the first and second finger like portions 128, 130, the first arm 120 may slide relative to the third arm 136 and the second arm 122 may slide relative to the fourth arm 140. This sliding motion cases the arm lock to be moved further into the space between the first and second finger like portions 128, 130.

After the arm lock 134 is fully engaged with the space between the space between the first and second finger like portions 128, 130, such that the first and second arms 120, 122 may no longer slide angularly downwardly relative to the third and fourth arms 136, 140, the foldable table 100 is locked in the raised position, as shown in FIG. 3. The raising sequence may be performed by one hand of the user, for example, by the user grasping the handle 112 and rotating or pivoting the table top 102 upwardly, and then sliding the table top 102 angularly downwardly to fully engage the arm lock 134 with the space between the space between the first and second finger like portions 128, 130. It should be appreciated that the interaction between the first and third arms 120, 136 and the interaction between the second and fourth arms 122, 140 is substantially the same.

The folding sequence, when the table 100 is moved from the raised position to the folded position, may be performed by reversing the order of the raising sequence. For example, the first and second arms 120, 122 may slide angularly upward relative to the third and fourth arms 136, 140, which causes the arm lock 134 to be disposed proximate to the notch 132. Once the arm lock 134 reaches the notch 132, the first and second arms 120, 122 may be rotated or pivoted downward relative to the third and fourth arms 136, 140 in response to a user pushing the support member 124 in a direction indicated by arrow 152. For example, the first finger like portion 128 flexes away from the second finger like portion 130, against the spring force of the first finger like portion 128, due to the interaction of the first and second finger like portions 128, 130 with the arm lock 134. As the table top 102 is moved further to the folded position, the arm lock 134 moves out of the notch 132 and the space between the first and second finger like portions 128, 130, and the first finger like portion 128 flexes back towards the second finger like portion 130, due to the spring force of the first finger like portion 128. The table top 102 and the table 100 may then be moved fully to the folded position.

As discussed above, the table 100 may include a magnet 116. The magnet 116 may be flat with a substantially rectangular shape. As illustrated, two magnets 116 are used and are formed on or coupled to a respective magnet mounting plate 146. The magnet mounting plate 146 is formed on or coupled to the mounting structure 106. Any number, sizes, shapes, and thicknesses of magnets 116 may be used without departing from the spirit and scope of the present invention. In addition, the magnet may be coupled directly to the mounting structure 106 or the table top 102.

The mounting structure 106 may be a flange with a number of mounting apertures 148 adapted to respectively receive fasteners. The mounting structure 106 may be formed or machined into a single piece or may be formed from several structures. For example, the mounting structure 106 may include an arm mounting structure 150 (as illustrated in FIG. 4). The arm mounting structure 150 may be formed or machined into a single piece or may be formed from several structures and coupled to the mounting structure 106. For example, the arm mounts 142 for the third and arms 136 and 140, and the magnet mounting plates 146 may be coupled to the arm mounting structure 150. However, the present invention is not limited to this arrangement. For example, the arm mounts 142 and the magnet mounting plates 146 may be directly coupled to the mounting structure 106.

Figure 8:
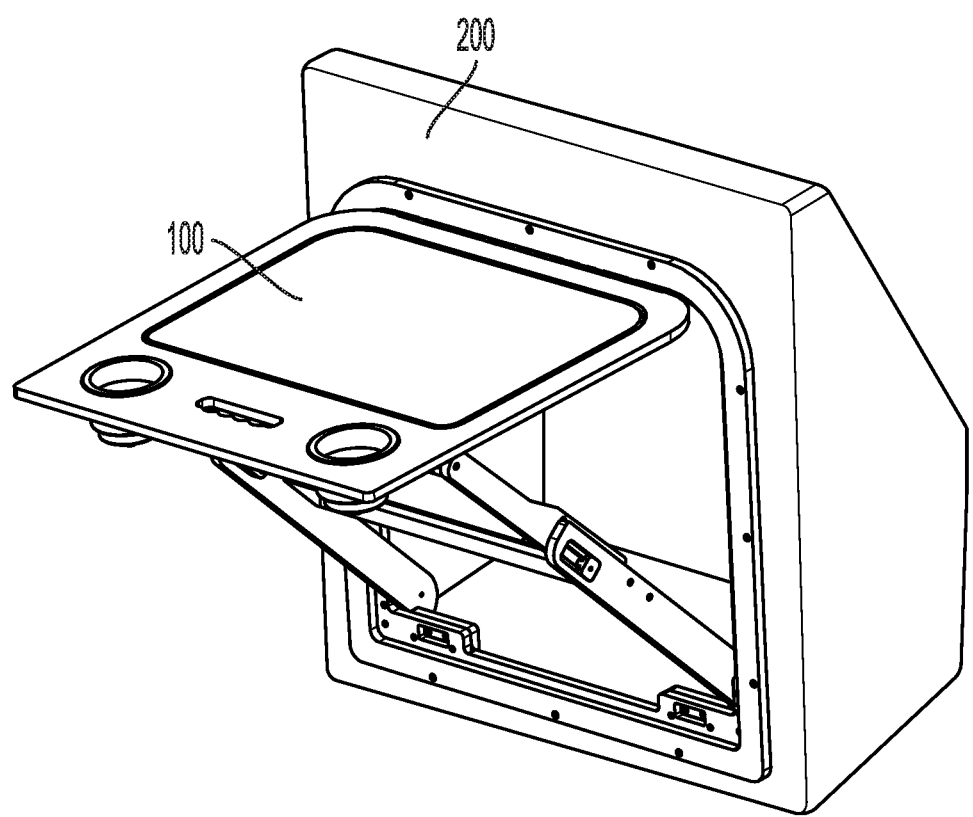
FIG. 8 is a perspective view of a foldable table in a raised position according to an embodiment of the present invention.

Referring to FIG. 8, the mounting structure 106 may be formed on or coupled to a piece of furniture 200 in a vehicle. As illustrated, the space behind the foldable table 100 in the folded position may be used as storage. The furniture 200 could also be a wall, seat, storage compartment, etc. in a building, shed, and/or other similar structure. Additionally, the mounting structure 106 may be coupled to a wall or side of a vehicle, building, shed, etc. due to the thin profile of the foldable table 100.

Figure 9:
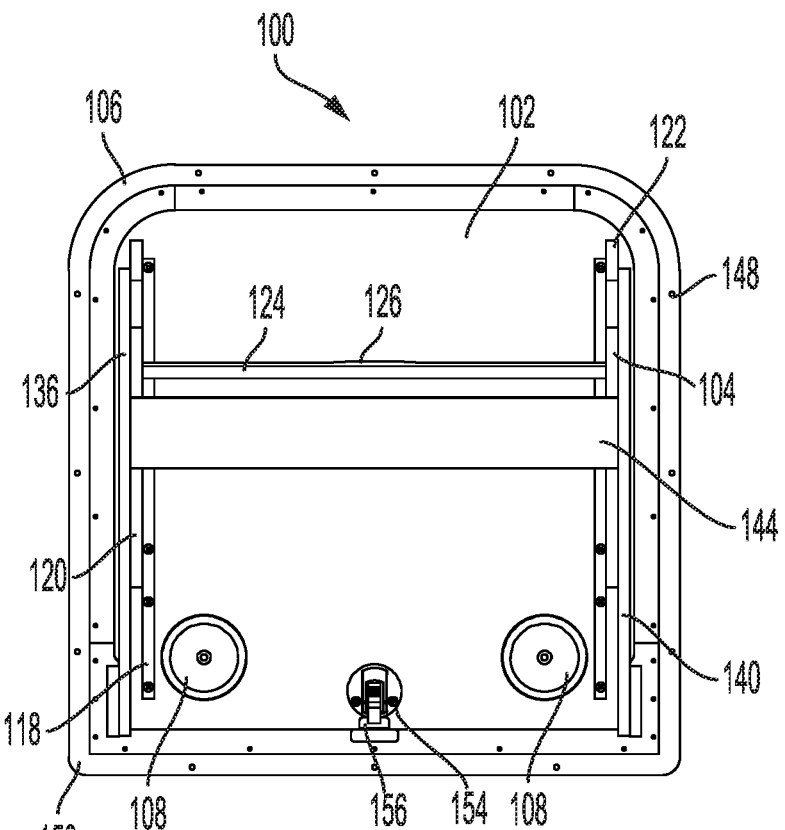
FIG. 9 is a back view of a foldable table in a folded position according to an embodiment of the present invention.
Figure 10:
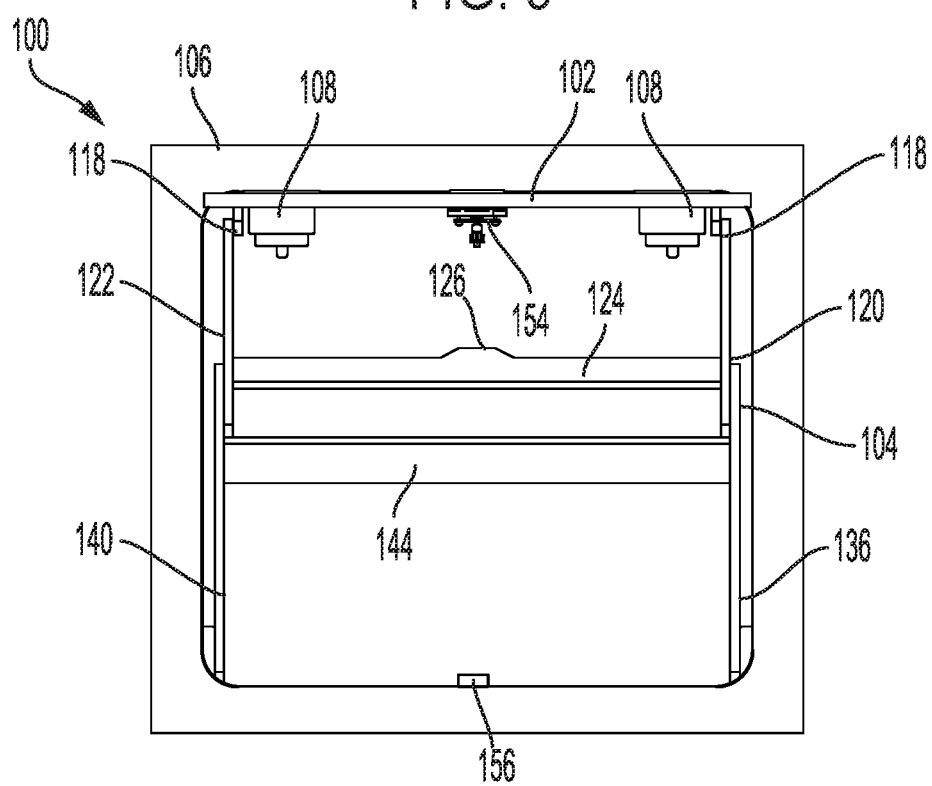
FIG. 10 is a front view of the foldable table of FIG. 9 in a raised position.
Figure 11:
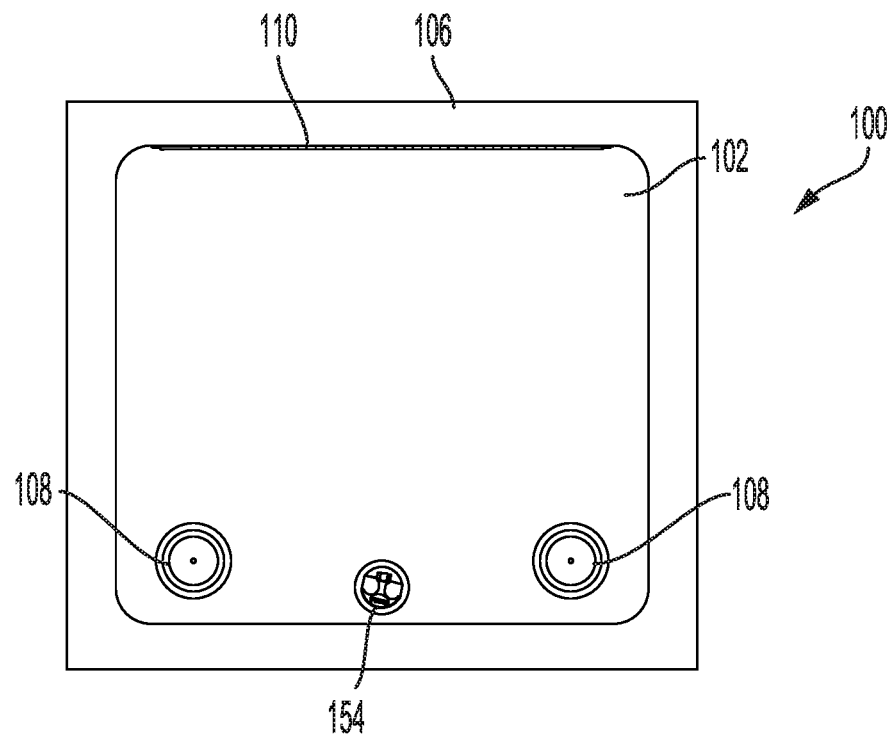
FIG. 11 is a front view of the foldable table of FIG. 9 in a folded position

Referring to FIGS. 9-11, the foldable table 100 may be held in the folded position by a latch 154 disposed on the table top 102. The latch may be a flush latch and may also be used as a handle for the raising and lowering sequences. The latch 154 may be locking or non-locking.

The latch 154 may engage with a protrusion 156 formed on or coupled to the mounting structure 106. When the latch 154 is engaged with the protrusion 156, the foldable table 100 is held in the folded position. The protrusion 156 may operate as a cam if the latch 154 is a flush latch, as illustrated.

The foldable table 100 may include a gasket (not shown). The gasket may be formed on or coupled to the mounting structure 106 or the table top 102. When the foldable table is in the folded position, the gasket may be adapted to form a seal between the mounting structure 106 and the table top 102 to reduce water intrusion and rattling. The gasket may be a bulb seal, or other type of seal. The gasket may be made of rubber, but other suitable materials, such as polyurethane, silicone, etc., may be used.

Figure 12:
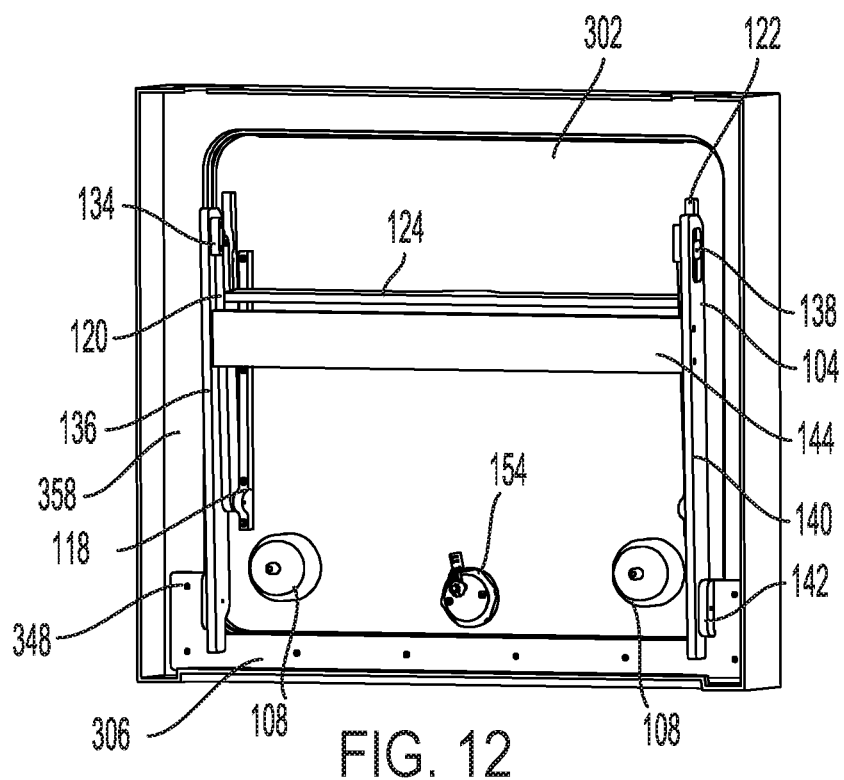
FIG. 12 is a perspective view of a foldable table in a folded position according to an embodiment of the present invention.

Referring to FIG. 12, the support structure 104 may be coupled to an existing table 302. As illustrated, the support structure 104 is similarly rotatably or pivotally coupled to the existing table 302 and the mounting structure 306 in a similar manner as described above.

The mounting structure 306 may be coupled to an existing table support structure 358. As illustrated, the mounting structure 306 is coupled to the existing support structure 358 by a number of mounting apertures 348 adapted to respectively receive fasteners.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A table comprising:
   a table top pivotably coupled to a mounting structure; and
   a support structure pivotably coupled to the table top and the mounting structure, the support structure including first and second arms that are pivotably and slidably coupled together, wherein the first arm includes a first end pivotably coupled to the table top, and a second end pivotably and slidably coupled to the second arm, wherein the second end includes first and second finger portions, and wherein pivotal and sliding movement between the first and second arms allows the table top to be disposed in one of either raised and folded positions, and the first finger portion is adapted to flex away from the second finger portion when the first arm is pivoted with respect to the second arm.

2. The table of claim 1, further comprising an arm lock coupled to the second arm, wherein the arm lock is adapted to slide between the first and second finger portions when the first arm is slid with respect to the second arm.

3. The table of claim 2, wherein the first finger portion is adapted to abut the arm lock and flex away from the second finger portion when the first arm is pivoted with respect to the second arm.

4. A table comprising:
   a flange adapted to be coupled to a structure;
   a table top pivotably coupled to the flange and adapted to be disposed in raised and folded positions; and
   a support structure pivotably coupled to the table top and the flange, the support structure includes:
      first and second arms that each has first and second ends, wherein the first ends are pivotably coupled to the table top, and wherein each of the second ends includes first and second finger portions;
      a third arm pivotably coupled to the flange and pivotably and slidably coupled to the second end of the first arm, wherein the first finger portion of the first arm is adapted to flex away from the second finger portion of the first arm when the first arm is pivoted with respect to the third arm; and
      a fourth arm pivotably coupled to the flange and pivotably and slidably coupled to the second end of the second arm.

5. The table of claim 4, further comprising a first arm lock coupled to the third arm, wherein the first arm lock is adapted to slide between the first and second finger portions of the first arm when the first arm is slid with respect to the third arm.

6. The table of claim 5, wherein the first finger portion of the first arm is adapted to abut the first arm lock and flex away from the second finger portion of the first arm when the first arm is pivoted with respect to the third arm.

7. The table of claim 5, further comprising a second arm lock coupled to the fourth arm, wherein the second arm lock is adapted to slide between the first and second finger portions of the second arm when the second arm is slid with respect to the fourth arm.

8. The table of claim 7, wherein the first finger portion of the second arm is adapted to abut the second arm lock and flex away from the second finger portion of the second arm when the second arm is pivoted with respect to the fourth arm.

9. A method of moving a table from a folded position to a raised position, comprising:
   pivoting a table top disposed in the folded position in an upward direction;
   pivoting, based on the pivoting of the table top, a first arm that is coupled to the table top with respect to a second arm; and
   causing, based on the pivoting of the first arm, a first finger portion of the first arm to abut an arm lock coupled to the second arm and flex away from a second finger portion of the first arm.

10. The method of claim 9, further comprising causing, based on the pivoting of the first arm, the arm lock to be received in a notch of the first finger portion.

11. The method of claim 10, further comprising causing, based on the pivoting of the first arm, the first finger portion to flex towards the second arm when the arm lock is moved out of the notch and received between the first and second finger portions.

12. The method of claim 11, further comprising sliding the first arm downwardly with respect to the second arm to place the table top in the raised position.

* * * * *